March 31, 1936.   W. J. GUTHRIE   2,035,702
APPARATUS FOR MEASURING THE AXIAL FORCE IN A LINE OF SHAFTING
Filed Oct. 17, 1934   2 Sheets-Sheet 1
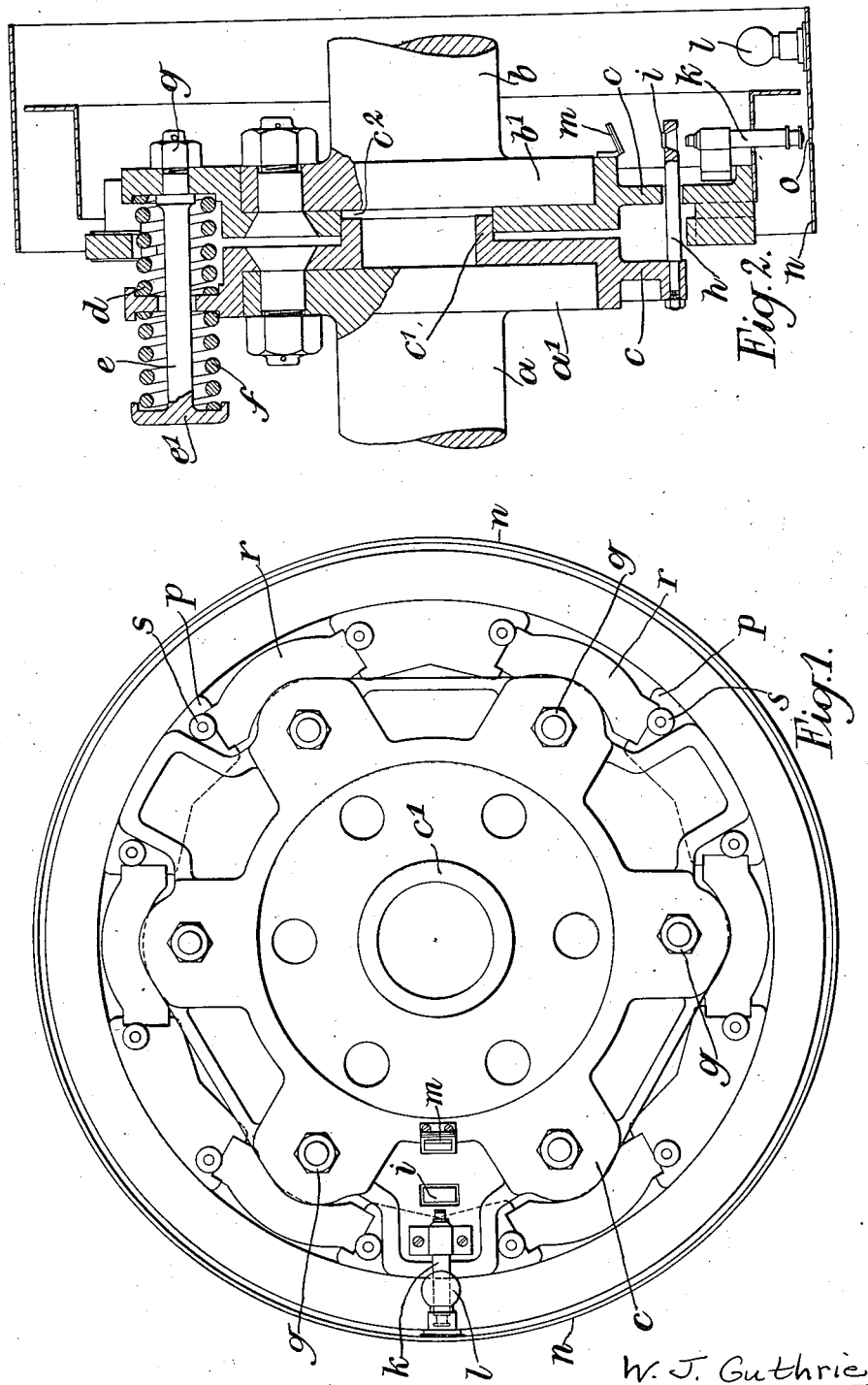

March 31, 1936.  W. J. GUTHRIE  2,035,702
APPARATUS FOR MEASURING THE AXIAL FORCE IN A LINE OF SHAFTING
Filed Oct. 17, 1934  2 Sheets-Sheet 2

W. J. Guthrie
INVENTOR

By Glascock Downing Seebold
Attys.

Patented Mar. 31, 1936

2,035,702

UNITED STATES PATENT OFFICE 2,035,702

APPARATUS FOR MEASURING THE AXIAL FORCE IN A LINE OF SHAFTING

William James Guthrie, Dumbarton, Scotland, assignor to William Denny & Brothers Limited, Dumbarton, Scotland Application October 17, 1934, Serial No. 748,743
In Great Britain November 28, 1933

4 Claims. (Cl. 265—1)

This invention has for its object to devise a simple and accurate means for measuring the axial force in a shaft or line of shafting, the invention being particularly adapted for measurement of thrust in a ship's propeller shafting but being suitable for application generally to the measurement of either compressive or tensile stresses in any rotating shaft or shafting.

The invention consists in apparatus for measuring the axial force in a line of shafting comprising elastic means through which the axial force is transmitted and means for measuring the deflection of such elastic means.

The invention also consists in apparatus according to the preceding paragraph having an optical system for measuring the deflection of the elastic means.

The invention also consists in apparatus according to either of the two preceding paragraphs in which the elastic means connects two parts of the shaft which are movable axially in relation to one another under the axial force to be measured.

The invention further consists in apparatus according to the preceding paragraph in which torque is transmitted from one shaft to the other by means permitting relative axial movement of the shafts or shaft parts.

Further features of the invention will be apparent from the description given hereafter.

The accompanying drawings illustrate two modes of carrying out the invention.

Figure 1 is an end elevation of one form of apparatus in accordance with the invention.

Figure 2 is a half side elevation and a half sectional plan of Figure 1.

Figure 4:
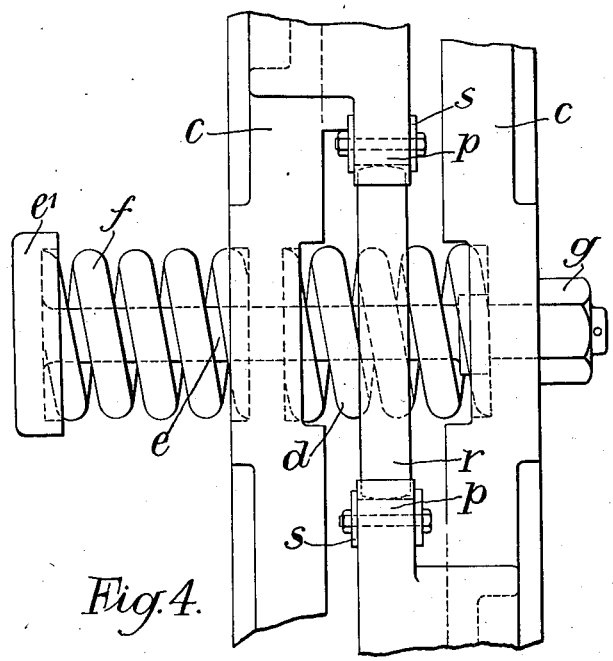
Figure 4 shows a detail of Figure 1 on a somewhat larger scale.

In carrying my invention into effect in one convenient manner as illustrated in Figures 1, 2 and 4 I rigidly secure upon the adjacent ends of two shafts $a$ $b$ or form upon such ends discs or collars $a'$ $b'$ to each of which I bolt or otherwise rigidly secure an annular disc-like or similar member $c$, it being convenient to provide one of such members with a central boss $c'$ adapted to be guided in a central aperture $c^2$ in the other member. Between these members $c$ and at the outer periphery of such I arrange a number of springs $d$ located in recesses in the members $c$ and through each of which passes a bolt $e$ rigidly secured to one member and passing freely through the second member and having at its free end an enlarged head $e'$ between which and the second member $c$ is a second spring $f$ also surrounding the bolt $e$, the first and second mentioned spring $d$ and $f$ being referred to hereafter for clearness respectively as the inner and outer springs.

The bolts $e$ are of such length that when the nuts $g$ securing the same to one member $c$ are tightly screwed up both inner and outer springs are partially compressed.

The arrangement is such that when a compressing force acts along the axis of the shaft the inner springs $d$ are further compressed and the compression of the outer springs $f$ is partly released so that the members $c$ between which the inner springs are located move towards one another and conversely when a tensile force acts along the axis of the spring the said members move away from one another, the inner springs being partly released and the outer springs further compressed. In either case the relative movement of the members is equal to the deflection of each spring and such relative movement is a measure of the axial force applied in the shaft. For the purpose of measuring this deflection I secure to one member $c$ a rod $h$ adapted to be passed freely through the second member and carrying a scale $i$ which is associated with a microscope $k$ or like optical system rigidly carried by the second member. An index mark is arranged in the diaphragm of the microscope against which the scale may be read so that the amount of the relative movement of the members $c$ carrying the scale and microscope may be measured, it being convenient for the scale to be calibrated in terms of the force corresponding to the axial movements so that such force may be directly read in the optical system.

Figure 3:
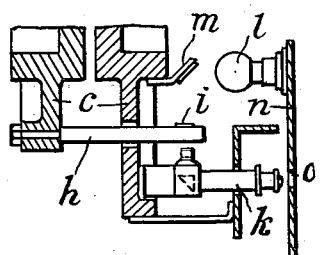
Figure 3 is a view showing a modification of a detail.

It is convenient to engrave the scale on glass or other transparent or translucent material so that it may be illuminated by means of an electric lamp $l$ or other external source of illumination, the rays of which are directed on to the scale by a mirror $m$ and to facilitate observation of the microscope field I may provide a suitable casing or baffle $n$ having an eye opening $o$ therein, the baffle being in the shape of a sleeve or cylinder surrounding the whole apparatus when the observation is in a direction radial to the shaft, as in the form shown in Figure 2, or in the form of a disc if the microscope is provided with a right angled prism or other similar means to permit of observation in the axial direction as shown in Figure 3, and in any modification of the invention I may omit the field lens from the microscope and provide a large eyepiece so as to enable the observer to view the scale with his eye at some distance from the microscope.

For the purpose of enabling torque to be transmitted from one shaft to the other I provide projections $p$ upon the members $c$ carrying the scale and microscope respectively, the projections being arranged so that their centres are in the same vertical plane and being provided with recesses so that between adjacent projections upon the respective members I may arrange a distance or bridgepiece $r$ by means of which the torque is transmitted. The ends of the bridgepiece $r$ are curved, as shown in Figure 4, so as to form parts of a cylindrical surface, the diameter of which is equal to the distance between the opposite faces of the recesses in order that in this way the distancepieces are permitted to roll in the recesses in which they are placed so that axial movement of the shaft parts is not in any way impeded. Lateral plates $s$ may be secured to the projections upon the members in order to prevent the distancepieces from falling out.

Having now described my invention, what I claim as new and desire to secure by Letters Patent is:—

1. Apparatus for measuring the axial force in a rotating shaft or line of rotating shafting comprising two members rigidly secured to two shaft parts, a plurality of bolts secured near the periphery of one member and passing freely through openings in the other, one set of springs surrounding the bolt parts between the members, a second set of springs surrounding the outer ends of the bolts and each located between the enlarged head on its bolt and the adjacent member and means connecting the members to transmit torque from one to the other while permitting relative axial movement between them under the influence of the axial force in the shafting.

2. Apparatus according to claim 1 having a microscope and scale carried respectively by the two members secured to the shaft parts and cooperating with one another to measure the relative axial movement between said members.

3. Apparatus according to claim 1 having bridgepieces disposed between projections upon said members to transmit the torque from one member to another, said bridgepieces having surfaces shaped so as to act as rollers to permit of the relative axial movement between said members.

4. Apparatus according to claim 1 having a scale and microscope carried respectively by the members secured to the shaft parts, a stationary baffle surrounding the rotating parts and having an eye-hole for viewing the microscope field and a lamp carried by said stationary baffle to illuminate said field.

WILLIAM JAMES GUTHRIE.